US008869058B1

(12) United States Patent
De et al.

(10) Patent No.: US 8,869,058 B1
(45) Date of Patent: Oct. 21, 2014

(54) INTERFACE ELEMENTS FOR SPECIFYING POSE INFORMATION FOR PHOTOGRAPHS IN AN ONLINE MAP SYSTEM

(75) Inventors: Arijit De, Bangalore (IN); Lalitesh Katragadda, Bangalore (IN); Sreejit Unnikrishnan, Bangalore (IN); Sundeep Sancheti, Bangalore (IN)

(73) Assignee: Google Inc., Mountain View, CA (US)

( * ) Notice: Subject to any disclaimer, the term of this patent is extended or adjusted under 35 U.S.C. 154(b) by 72 days.

(21) Appl. No.: 13/480,799

(22) Filed: May 25, 2012

(51) Int. Cl.
*G06F 3/048* (2013.01)

(52) U.S. Cl.
USPC .......................................... 715/771; 715/848

(58) Field of Classification Search
USPC ................................................ 715/771, 848
See application file for complete search history.

(56) References Cited

U.S. PATENT DOCUMENTS

| | | | |
|---|---|---|---|
| 6,222,937 B1 * | 4/2001 | Cohen et al. | 382/154 |
| 6,741,864 B2 * | 5/2004 | Wilcock et al. | 455/456.1 |
| 7,096,211 B2 * | 8/2006 | Fujihara | 706/58 |
| 7,526,718 B2 | 4/2009 | Samadani et al. | |
| 7,990,455 B2 * | 8/2011 | Iga | 348/333.02 |
| 8,160,400 B2 * | 4/2012 | Snavely et al. | 382/305 |
| 8,248,503 B2 * | 8/2012 | Sogoh et al. | 348/333.02 |
| 8,453,060 B2 * | 5/2013 | Ofek et al. | 715/757 |
| 2001/0048377 A1 * | 12/2001 | Mochizuki et al. | 340/988 |
| 2006/0028548 A1 * | 2/2006 | Salivar et al. | 348/143 |
| 2006/0293837 A1 * | 12/2006 | Bennett | 701/200 |
| 2007/0070233 A1 * | 3/2007 | Patterson | 348/333.12 |
| 2009/0245691 A1 * | 10/2009 | Naimark et al. | 382/285 |
| 2010/0141767 A1 * | 6/2010 | Mohanty et al. | 348/159 |
| 2011/0025845 A1 * | 2/2011 | Han et al. | 348/140 |
| 2011/0187716 A1 * | 8/2011 | Chen et al. | 345/427 |

* cited by examiner

*Primary Examiner* — Steven Sax
*Assistant Examiner* — Wilson Varga
(74) *Attorney, Agent, or Firm* — Fenwick & West LLP

(57) ABSTRACT

One or more interactive controls are displayed on an online map that allow a user to provide attributes about a photograph including the location from which the photograph was taken and the location of the subject in the photograph. The system receives the input and stores the information as associated with the photograph.

16 Claims, 13 Drawing Sheets

INTERFACE ELEMENTS FOR SPECIFYING POSE INFORMATION FOR PHOTOGRAPHS IN AN ONLINE MAP SYSTEM

FIELD

The present disclosure is related to user-contributed photographs to on-line maps and determining attributes of the user-contributed photographs.

DESCRIPTION OF THE BACKGROUND ART

Photographs on on-line maps have the potential of being very useful. For example, with a photograph of a map feature, a user can see what the map feature looks like without being there. Conventionally, photographs associated with features on on-line maps are simply placed on a map with an icon and somehow associated with the map feature. However, such placement alone does not provide a clear indication of where the camera was when the photograph was taken or the distance from the camera to the subject of the photograph. These attributes are sometimes referred to as pose information of the photograph. Further, photographic metadata associated with the image, such as EXIF data, typically describes the parameters of the camera and exposure, and does not contain any information as to relative placement of the camera with respect to the subject matter of the photograph.

SUMMARY

A computer-implemented method provides for display to a user one or more interactive controls on an online map. A user manipulates the controls to indicate various attributes about a photograph. In some embodiments, attributes include a location from which the photograph was taken, a location of the subject in the photograph, a line of sight from the location from which photograph was taken and the horizontal field of view of the photograph. In some embodiments, attributes include a distance and a direction from the location from which the photograph was taken to the subject in the photograph. Responsive to a request for a stored photograph, the photograph is provided for display on the map and displayed at the location of the subject of the photograph. In some embodiments, the photograph is associated with a map feature and the photograph is provided for display responsive to a request for a map on which the map feature is displayed.

Systems and non-transitory computer-readable storage media with executable programs stored thereon are provided that embody the disclosed methods.

The features and advantages described in this summary and the following detailed description are not all-inclusive. Many additional features and advantages will be apparent to one of ordinary skill in the art in view of the drawings, specification, and claims hereof.

DETAILED DESCRIPTION OF THE DRAWINGS

System Overview

Figure 1:
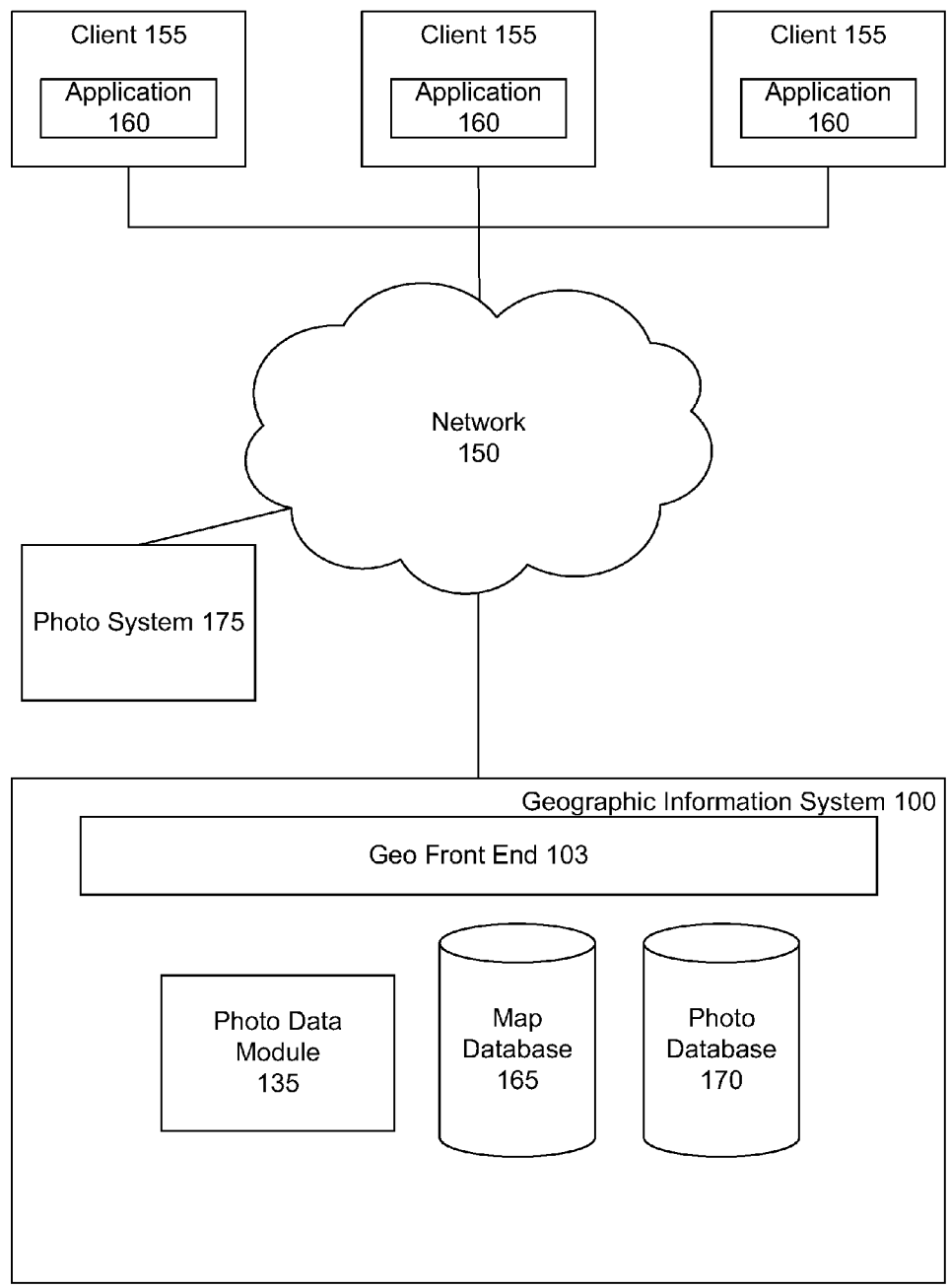
FIG. 1 is a diagram of system architecture according to one embodiment.

FIG. 1 is a diagram of system architecture according to one embodiment. The geographic information system ("GIS") 100 includes a geo front end 103, photo data module 135 map database 165 and photo database 170. A client 155, the GIS 100 and a photo system 175 communicate via the network 150. The GIS 100 communicates over the network 150 via the geo front end 103.

For simplicity, only three clients 155 are shown; in practice there will be numerous clients 155 communicating with GIS 100. Similarly, only a single GIS 100 and one photo system 175 are shown; in practice there might be many GISs 100 and photo systems 175 in operation. The client 155 can be any type of computing device that is adapted to access the GIS 100 over the network 150. An application 160 at the client 155 is a user interface used by the user to provide a photograph to the GIS 100 and enter photograph attributes. In one embodiment, the application 160 is a browser.

The network 150 through which the client 155 and GIS 100 communicate can be any type of network, wired or wireless, known in the art. Examples include the Internet, but may also be any network, including but not limited to a LAN, a MAN, a WAN, an 802.11 network, an 802.16 network, a mobile, wired or wireless network, telecommunication network, a private network, or a virtual private network, and any combination thereof.

The photo system 175 is any on-line photo storage system that allows users to upload and store photographs. Some photo systems 175 also allow for users to share photographs with other users and order printed copies of photographs. The photo system 175 can be accessed by the GIS 100 and the client 155 via the network 150. Examples of photo systems include, but are not limited to, PICASA™ available from GOOGLE™; SHUTTERFLY™; SNAPFISH™ and KODAK GALLERY™.

The map database 165 stores data related to the system. The data may be stored using any type of data storage system. Data includes map data, information about the users of the system, rules for making changes to the map data, edits and indices of this data. Map data is all data useful to create a map. Map data includes geographic data, such as latitude, longitude, elevation, political data, such as country, state, and city boundaries, address numbering on streets, features, events at features and attributes of features. A feature is anything that might appear on a map that would be useful or of interest to those using a map. Examples of features include bodies of water, mountains, forests, cities, addresses, streets, and government buildings. Attributes are characteristics and properties of the feature that would be useful in describing the feature or of interest to those using a map. The attributes of a feature include inherent characteristics and properties but the attributes are not required to be inherent characteristics and properties.

The photo database 170 stores photos provided to the GIS 100 to be displayed on maps as well as photo attributes. Photograph attributes describe the context in which a photograph was taken. This includes latitude and longitude of the camera when the photograph was taken. Additional photograph attributes include a horizontal field of view of the photograph, the distance from the camera to the subject in focus in the photograph, and the angle of the line of sight from geographic north. In some embodiments, the EXIF data, if available, is also stored in the photo database 170.

The photo data module 135 processes photos and photo attributes received from users and stores them in the photo database 170, and is one means for performing this function.

Process Overview

Figure 2:
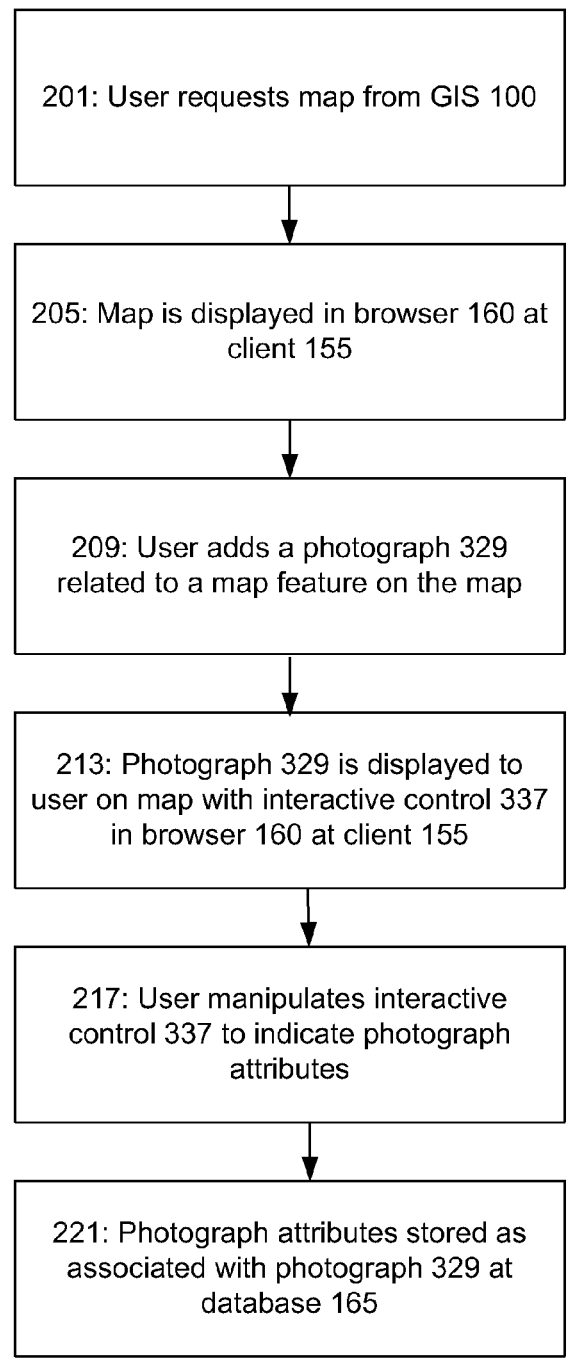
FIG. 2 is a data flow chart showing a method of editing map data according to one embodiment.

FIG. 2 is a sequence diagram showing a method of editing map data according to one embodiment. The functions of the various modules used to implement this method may be combined or divided differently than described in reference to this embodiment.

Using the application 160 at a client 155, a user requests 201 a map; this request is transmitted to the database 165 via the geo front end 103. The map is provided by the database 165 by providing a map page encoded with the feature information. The application 160 displays 205 the map at client 155.

Figure 3A:
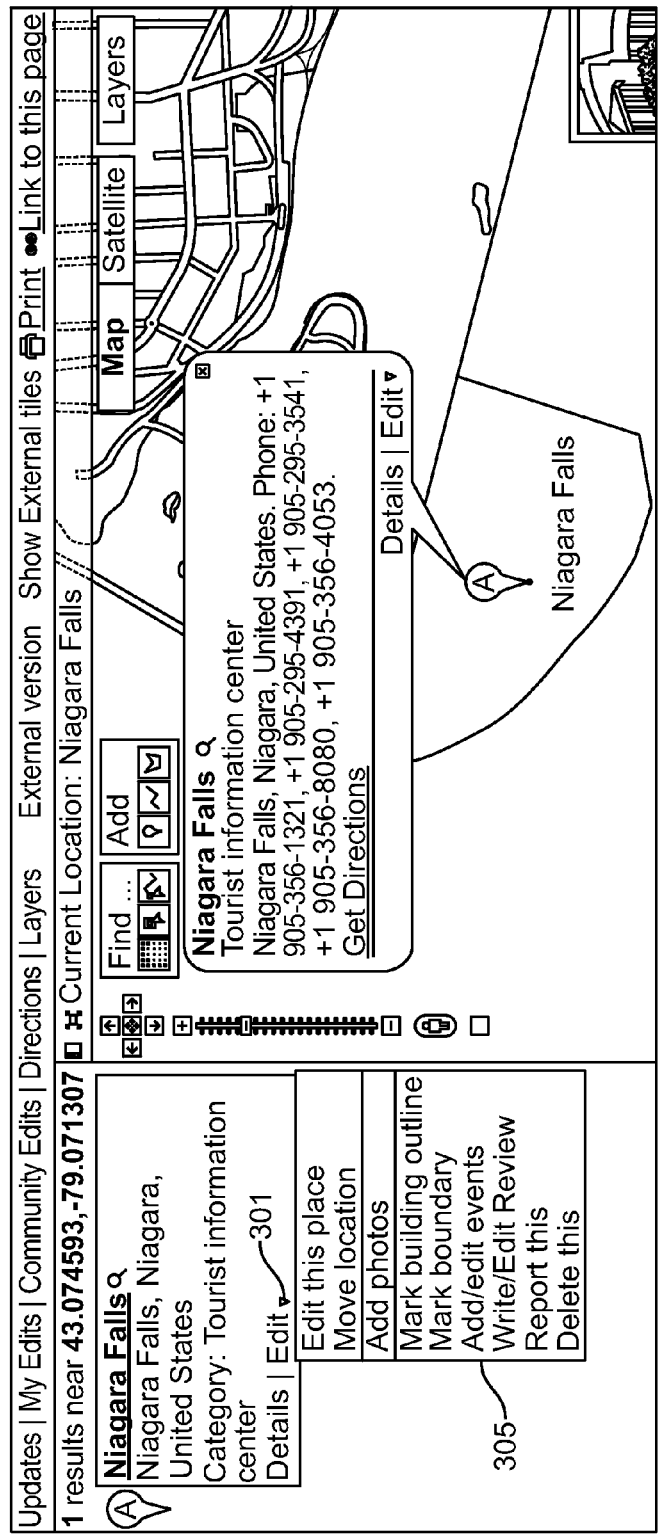
FIGS. 3A-3F are screenshots showing an interface for entering position information for a photograph according to one embodiment.
Figure 3B:
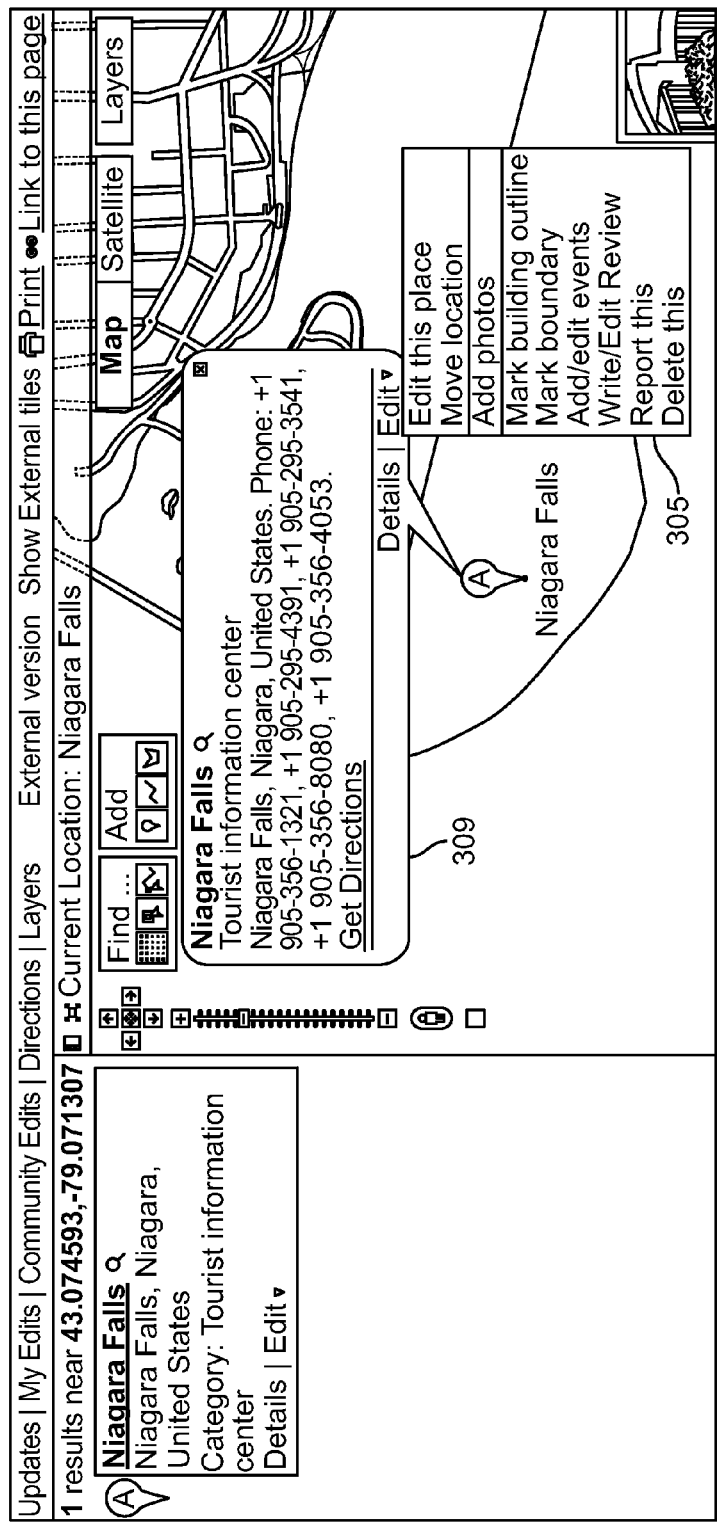
Figure 3C:
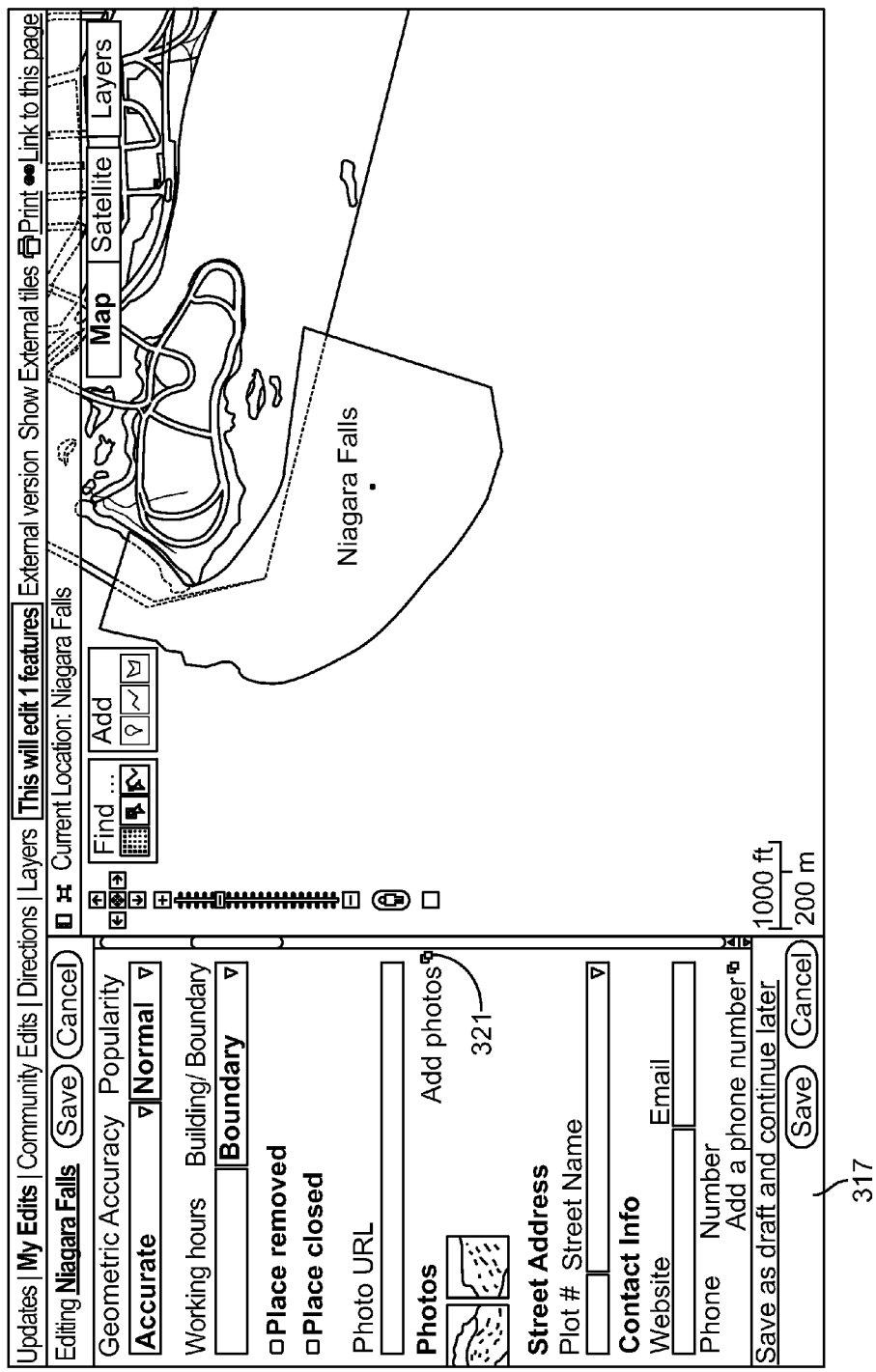

An example map with map feature, Niagara Falls, is illustrated in FIG. 3A. This map is displayed to the user in response to a user browsing to the location on the map or searching for the map feature, Niagara Falls. To add 209 a photograph relevant to Niagara Falls to the map, the user accesses an edit pull down menu 305 via edit button 301 and selects the "Add photos" option. FIG. 3B illustrates an additional edit pull down menu 305. This alternate edit pull down menu 305 is accessed from an information bubble 309 located in proximity to the Niagara Falls map feature. FIG. 3C illustrates an alternate route to accessing the ability to add a photo. In this scenario, the user has selected "Edit this place" option from the pull down menu 305. This displays the editing window 317. Inside the editing window 317 is an "Add photos" option 321.

Figure 3D:
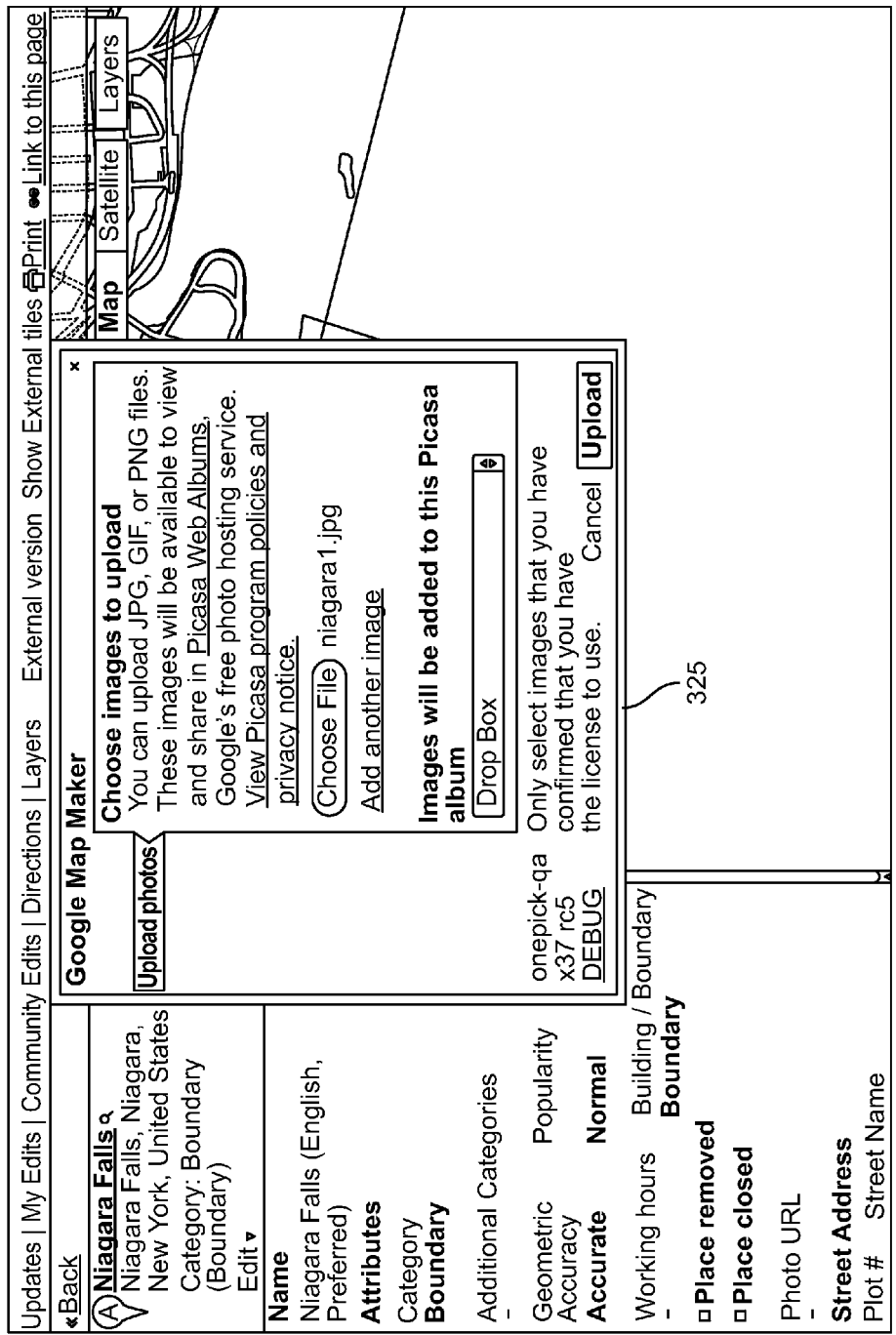

Referring to FIG. 3D, responsive to the user selecting "Add photos" through any of the above options the GIS 100 displays a photo upload dialog box 325. The user then selects a photograph for providing to the GIS 100. The photo may be located locally at the client device 155. Alternatively, the photo is stored at the photo system 175. To select a photograph stored at the photo system 175, the user may have to enter a username and password specific to the photo system 175 in order to access and select photographs from the photo system 175. The GIS 100 then receives a copy of the photograph from the photo system 175. In another alternative, the user has one account for both the GIS 100 and photo system 175. Accordingly, "adding" a photo can include not only uploading a photo but instead may include specifying a photo to be accessed by GIS 100.

Figure 3E:
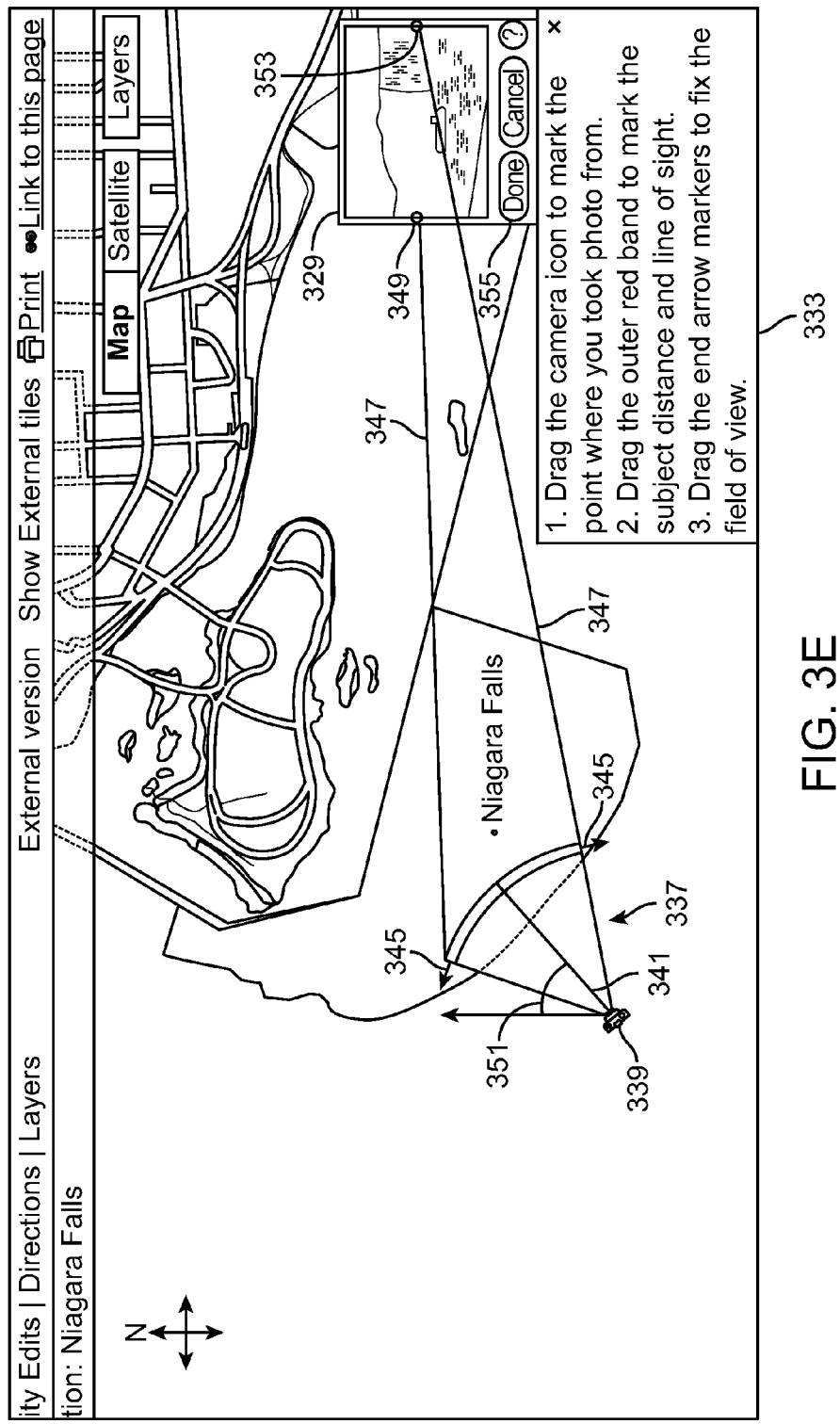

As illustrated by FIG. 3E, after the user has selected a photograph to add, the photograph 329 is displayed 213 to the user on the map in the application 160 along with an interactive control 337. Additionally, an instruction box 333 is displayed which provides instructions about using the interactive control 337. In this embodiment, the interactive control 337 appears as a single icon with components for providing certain photograph attributes: a camera location indicator 339, distance to subject in focus line 341 and an arc 345 for indicating on the map the horizontal field of view in the photograph 329. In alternate embodiments, the components for entering the attributes look more like individual independent icons. The user manipulates 217 the components of the interactive control 337 to provide the photograph attributes, which are received and stored by the GIS 100.

The interactive control 337 is operated as follows. The camera location indicator 339 is configured to be moved (e.g., dragged) to the point on the map corresponding to where the camera was when the photograph 329 was taken. For most examples, this is where the user was standing when the user took the photograph 329 but could also be where the camera was placed by the user when using a timer or remote control to trigger the shutter. The distance to subject in focus line 341 is adjusted responsive to movement of the arc 345 such that the center of the arc 345 is at the location of the subject in focus in the center of the photograph 329. The horizontal field of view is adjusted responsive to movement of the ends of the arc 345 to match the horizontal field of view in the photograph 329. The user interface optionally displays lines 347 from the ends of the arc 345 to points 349 and 353 on either side of the photograph. The lines 347 help guide the user as the user adjusts the ends of the arc 345 to indicate the horizontal field of view of the photograph 329. The final placement of the arc 345 also provides the angle 351 between the focus line 341 and geographic north.

After the user has manipulated 217 the interactive control 337 to provide the photograph attributes, the user clicks the "Done" button 355 on the photograph 329 and the attributes are stored 221 as associated with the uploaded photograph. The information is provided to the GIS 100 as latitude and longitude coordinates for those attributes that are points such as the camera location indicator 339. The arc 345 is represented as three points each represented by latitude and longitude coordinates—one at each end of the arc and the center of the arc. The arc 345 can also be defined in part by the angle between the two endpoints of the arc 345. The distance to subject in focus line 341 is calculated as the distance between the camera location indicator 339 and the center of the arc 345. In one embodiment, the data is received at the GIS 100 as a JSON object.

Figure 3F:
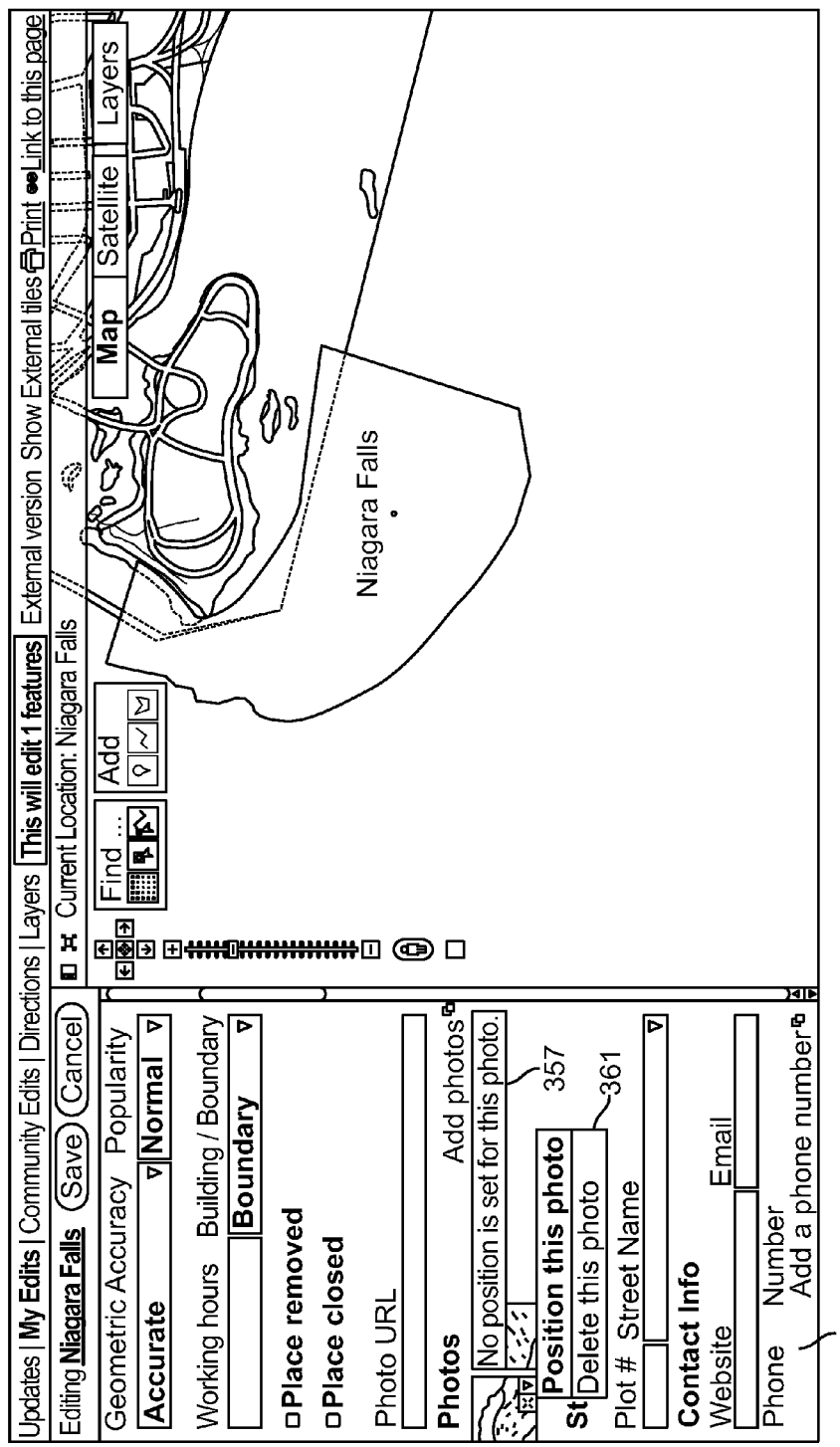

Attributes can also be added to photographs some period of time after the photograph was uploaded. FIG. 3F illustrates such a scenario. The user is editing the feature Niagara Falls. The photograph 329 is shown in the editing window 317 with a note 357 that the attributes (indicated as "position" in the figure) have not been provided. A drop down menu 361 is provided through which the user can add the attributes ("Position this photo"). Upon selecting to add attributes, the user interface displays the interactive control 337 for the user to provide attributes of the photograph.

Figure 4:
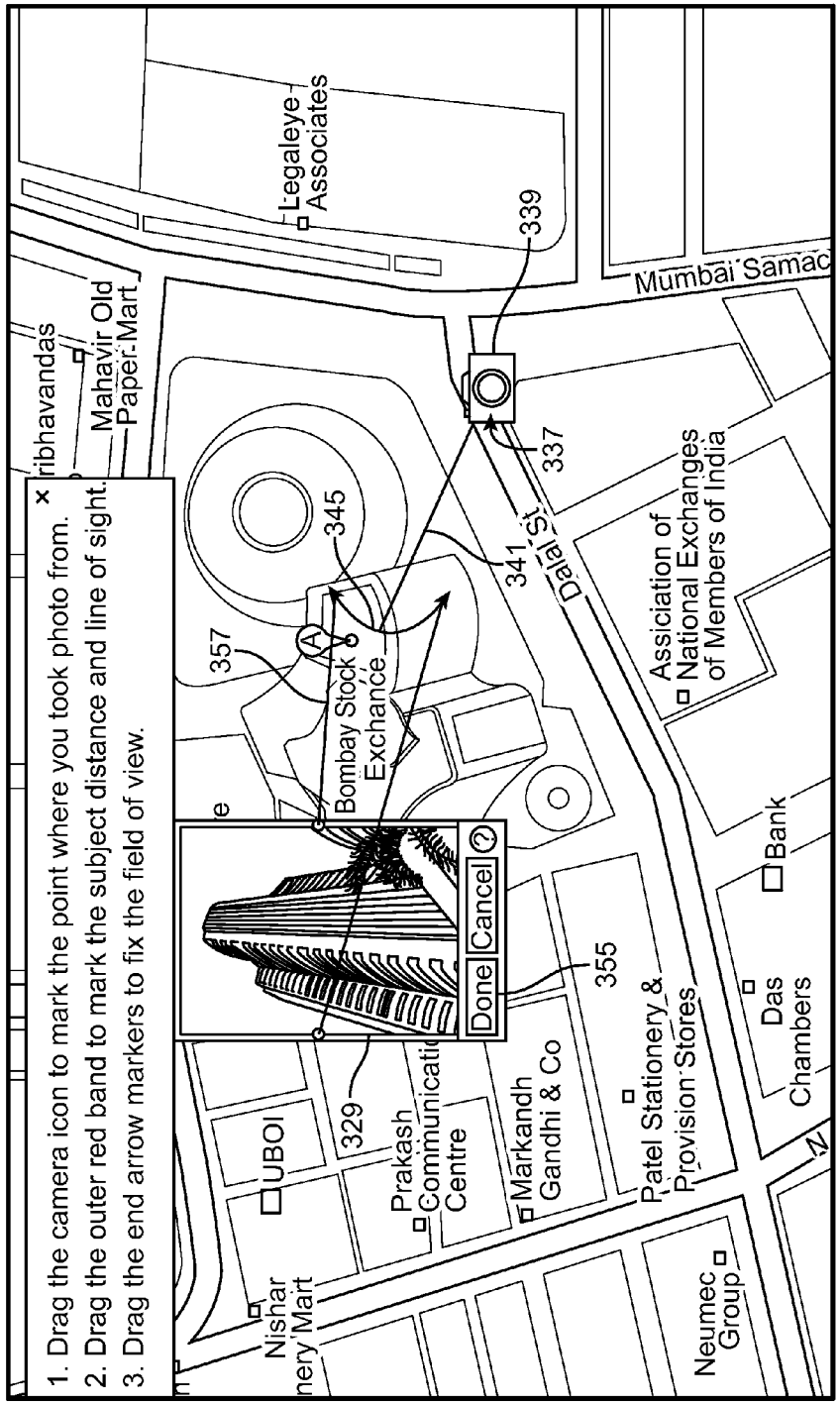
FIG. 4 is a screenshot showing an interface for entering position information for a photograph according to one embodiment.

FIG. 4 illustrates another example of an interface for a user to provide position information about a photograph. In this example, the map on which the photograph 329 is displayed includes a satellite image of the area represented on the map. As shown in FIG. 4, the interactive control 337 has components for providing photograph attributes: a camera location indicator 339, distance to subject in focus line 341 and an arc 345 for indicating on the map the horizontal field of view as well as the line of sight in the photograph 329. The user manipulates the components of the interactive control 337 to provide the photograph 329 attributes. The lines 347 help guide the user as the user adjusts the ends of the arc 345 to indicate the horizontal field of view of the photograph 329. The user clicks the "Done" button 355 on the photograph 329 and the attributes are stored 221 as associated with the uploaded photograph. The camera location The uploaded photograph is then available to display using one or all of the position attributes. Optionally, the photograph and/or its attributes are reviewed by reviewers prior to the photograph being available for display on the map.

Figure 5A:
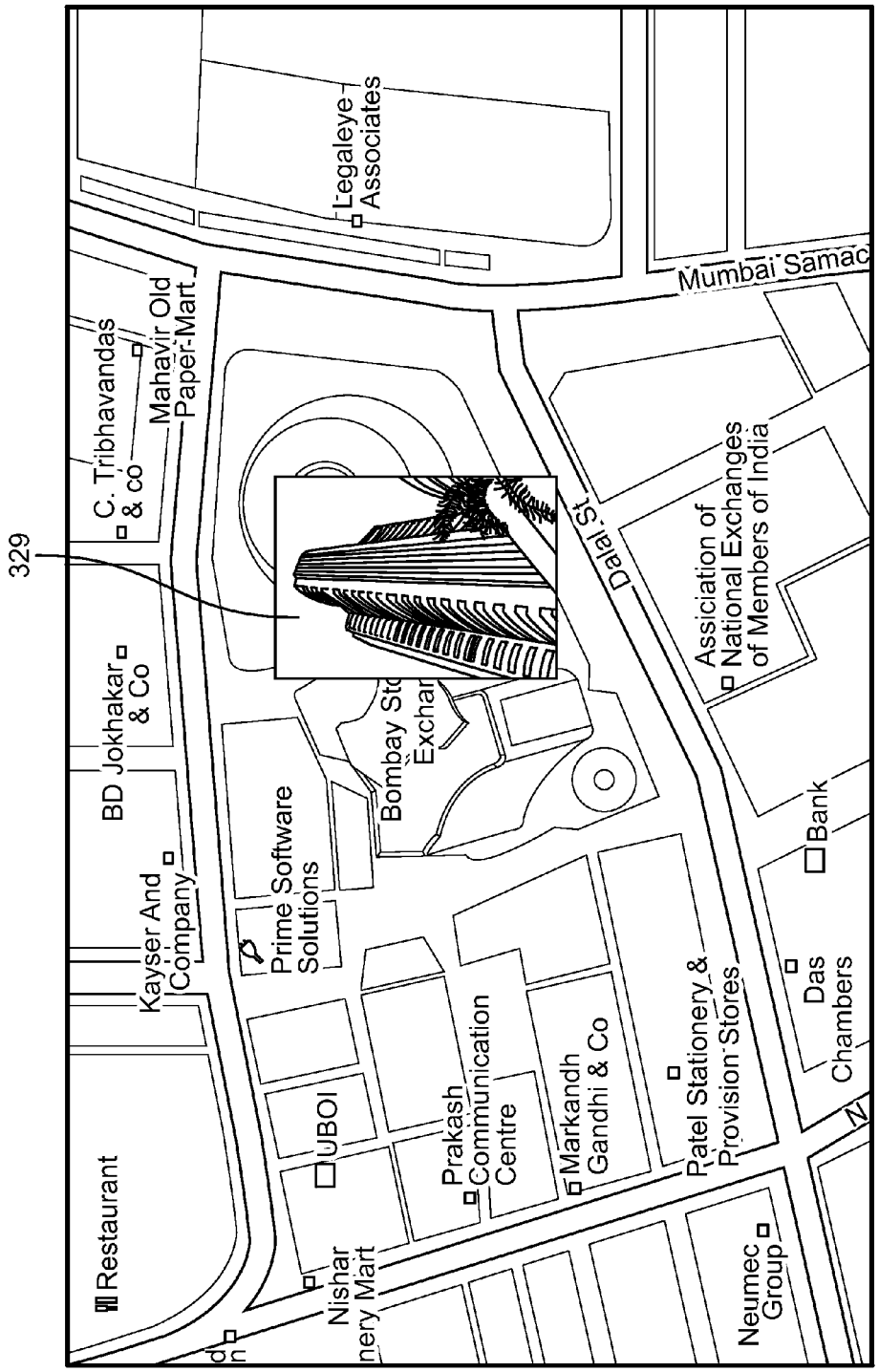
FIGS. 5A-D are screenshots illustrating display of a photograph on a map for which position information has been entered according to various embodiments.
Figure 5B:
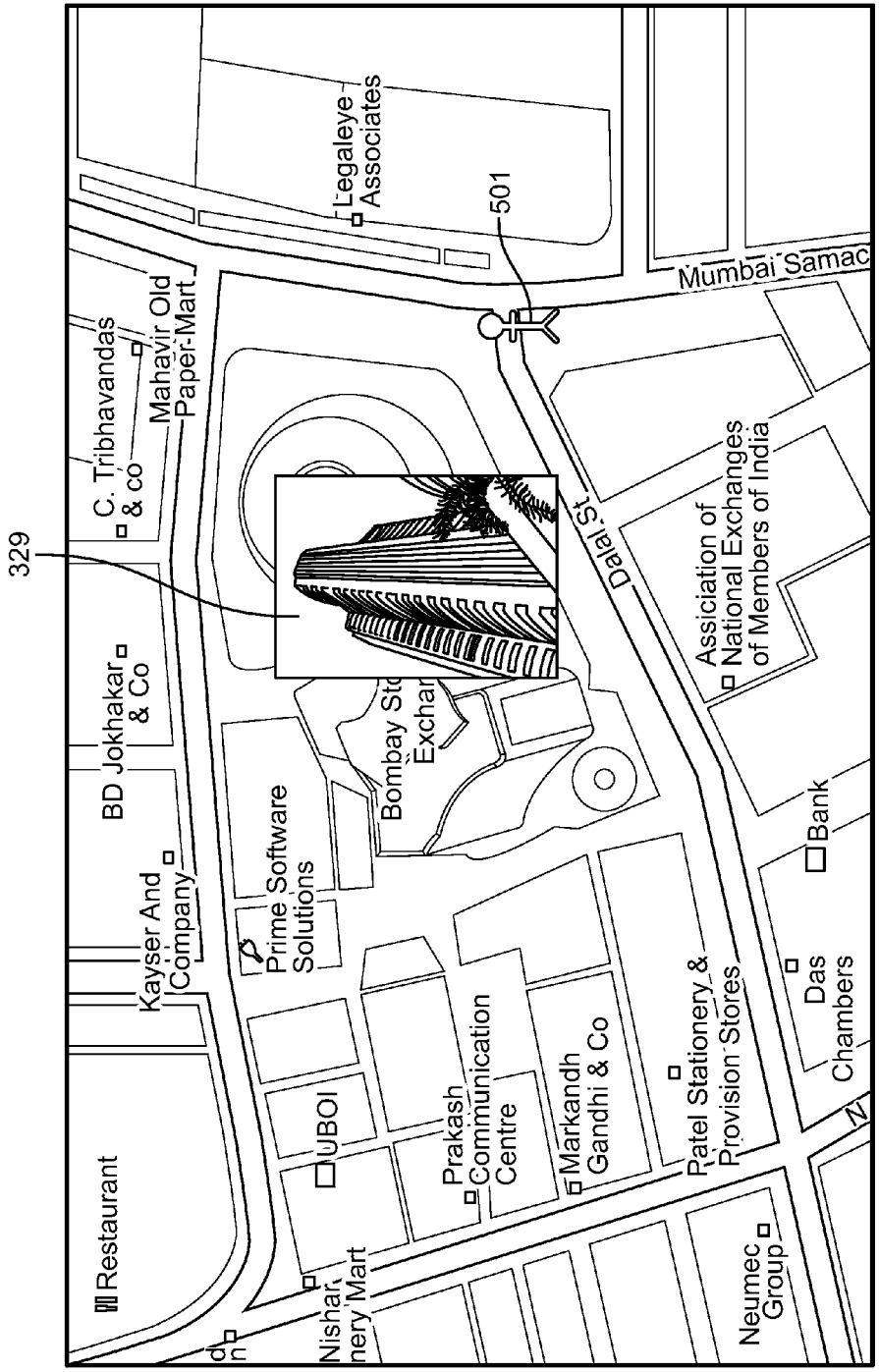
Figure 5C:
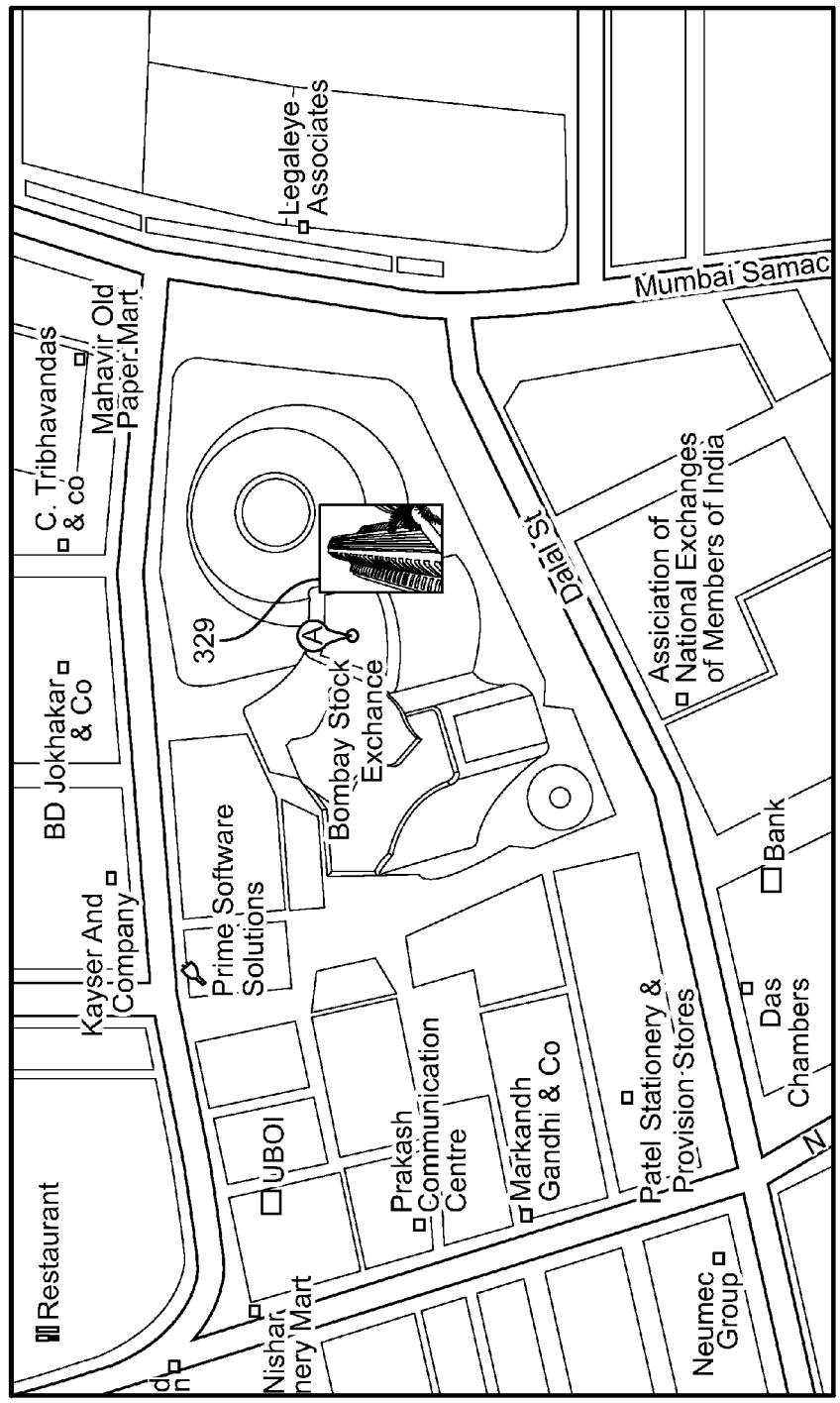
Figure 5D:
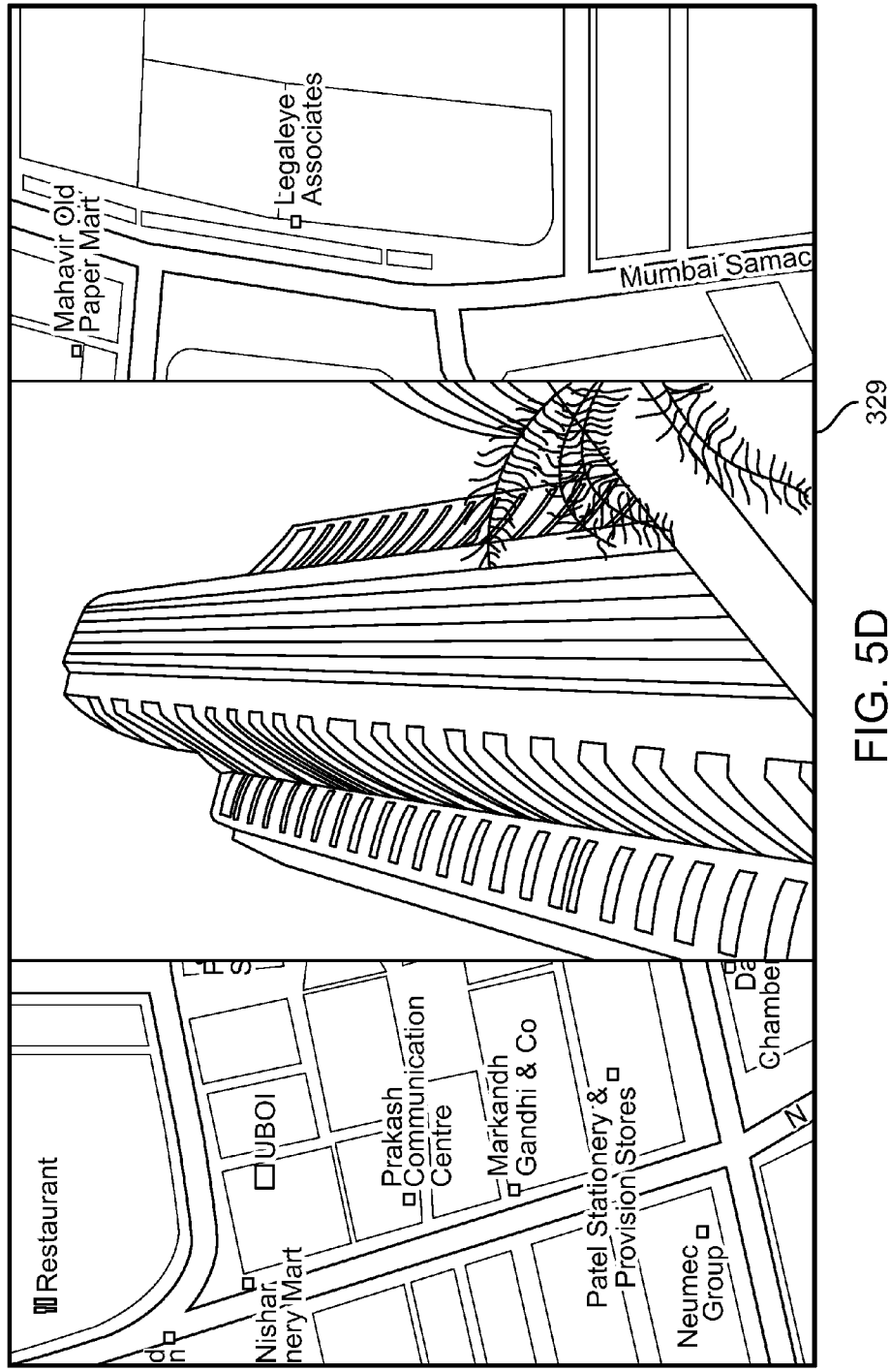

FIGS. 5A-5D illustrate the photograph 329 as displayed to a user on a map after it has been stored with its attributes. In FIG. 5A the photo 329 is placed on the map placing the photo at its horizontal field of view on the map. In one embodiment, the photo is placed on the map where the arc 345 and distance to subject in focus line 341 intersect based on the photo 329's attributes. FIG. 5B illustrates another embodiment where the photo 329 is placed at its horizontal field of view and a FIG. 501 is placed on the map at the point from which the photo 329 was taken. FIG. 5C illustrates the photo 329 in a smaller format. In some embodiments, if the user of a map clicks on the photo 329, a full-screen image of the photo 329 is shown.

The present disclosure has been described in particular detail with respect to several possible embodiments. Those of skill in the art will appreciate that the disclosure may be practiced in other embodiments. First, the particular naming of the modules, capitalization of terms, the attributes, data structures, or any other programming or structural aspect is not mandatory or significant, and the mechanisms that implement the disclosure or its features may have different names, formats, or protocols. Further, the system and the individual modules may be implemented as either software code executed by the computer system, or as hardware elements with dedicated circuit logic, or a combination of hardware and software. Also, the particular division of functionality between the various system components described herein is merely exemplary, and not mandatory; functions performed by a single system module may instead be performed by multiple modules, and functions performed by multiple modules may instead performed by a single module.

Some portions of above description present the features of the present disclosure in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of a method. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems. Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

The invention claimed is:

1. A computer-implemented method of displaying a photograph on a map comprising:
    providing the photograph for display at a client device;
    providing for display one or more interactive controls on an online map at the client device, the interactive controls comprising:
        a camera location indicator configured to be moved to a first point on the map corresponding to where the camera was located when the photograph was taken;
        a field of view arc configured to be moved on the map to a plurality of points corresponding to a horizontal field of view of the photograph; and
        a line of sight having one end at the camera location indicator and having a second end in a center of the field of view arc and configured to be updated responsive to interaction with the camera location indicator and the field of view arc;
    receiving input from a user using the one or more interactive controls at the client device, the input comprising:
        a first location on the online map from which a photograph was taken, the first location indicated using the camera location indicator; and
        a second location on the online map of a subject in the photograph, the second location indicated using the field of view arc indicating the horizontal field of view of the photograph;
    updating by one or more processors the line of sight on the online map based on the received first and second locations; and
    providing for display at the client device a map illustrating the photograph at a location determined by the second end of the line of sight.

2. The method of claim 1 wherein the interactive controls further comprise two lines, each line connecting one end of the field of view arc to the corresponding side of the photograph.

3. The method of claim 1 wherein the field of view arc is represented by three points.

4. The method of claim 1 wherein the field of view arc is defined by an angle between two endpoints of the field of view arc.

5. A system for displaying a photograph on a map comprising:
   a network interface configured to:
   provide the photograph for display at a client device;
   provide for display one or more interactive controls on an online map at the client device, the interactive controls comprising:
      a camera location indicator configured to be moved to a first point on the map corresponding to where the camera was located when the photograph was taken;
      a field of view arc configured to be moved on the map to a plurality of points corresponding to a horizontal field of view of the photograph; and
      a line of sight having one end at the camera location indicator and having a second end in a center of the field of view arc and configured to be updated responsive to interaction with the camera location indicator and the field of view arc; and
   receive input from a user using the one or more interactive controls at the client device, the input comprising:
      a first location on the online map from which a photograph was taken, the first location indicated using the camera location indicator; and
      a second location on the online map of a subject in the photograph, the second location indicated using the field of view arc indicating the horizontal field of view of the photograph;
   one or more processors configured to:
   update the line of sight on the online map based on the received first and second locations; and
   a database configured to store the received input as associated with the photograph.

6. The system of claim 5 wherein the network interface is further configured to:
   receive a request for the photograph; and
   provide the photograph for display on a map at the second end of the line of sight.

7. The system of claim 5 wherein the network interface is further configured to:
   receive a request for a map comprising the map feature; and
   provide the map for display with the photograph displayed at the second end of the line of sight on the map.

8. The system of claim 5 wherein the interactive controls further comprise two lines, each line connecting one end of the field of view arc to the corresponding side of the photograph.

9. The system of claim 5 wherein the field of view arc is represented by three points.

10. The system of claim 5 wherein the field of view arc is defined by an angle between two endpoints of the field of view arc.

11. A non-transitory computer-readable storage medium with an executable program stored thereon, wherein the program instructs one or more processors to perform steps comprising:
   providing the photograph for display at a client device;
   providing for display one or more interactive controls on an online map at the client device, the interactive controls comprising:
      a camera location indicator configured to be moved to a first point on the map corresponding to where the camera was located when the photograph was taken;
      a field of view arc configured to be moved on the map to a plurality of points corresponding to a horizontal field of view of the photograph; and
      a line of sight having one end at the camera location indicator and having a second end in a center of the field of view arc and configured to be updated responsive to interaction with the camera location indicator and the field of view arc;
   receiving input from a user using the one or more interactive controls at the client device, the input comprising:
      a first location on the online map from which a photograph was taken, the first location indicated using the camera location indicator; and
      a second location on the online map of a subject in the photograph, the second location indicated using the field of view arc indicating the horizontal field of view of the photograph; and
   updating by one or more processors the line of sight on the online map based on the received first and second locations.

12. The non-transitory computer-readable storage medium of claim 11 wherein the program further instructs one or more processors to provide the photograph for display on a map at the second end of the line of sight responsive to receiving a request for the photograph.

13. The non-transitory computer-readable storage medium of claim 11 wherein the photograph is associated with a map feature and the program further instructs one or more processors to provide a map for display with the photograph displayed at the second end of the line of sight on the map responsive to receiving a request for the map comprising the map feature.

14. The non-transitory computer-readable storage medium of claim 11 wherein the interactive controls further comprise two lines, each line connecting one end of the field of view arc to the corresponding side of the photograph.

15. The non-transitory computer-readable storage medium of claim 11 wherein the field of view arc is represented by three points.

16. The non-transitory computer-readable storage medium of claim 11 wherein the field of view arc is defined by an angle between two endpoints of the field of view arc.

* * * * *